June 25, 1929.  H. J. LILLFORD  1,718,369
COLLAPSIBLE IRRIGATION BAG
Filed May 8, 1926
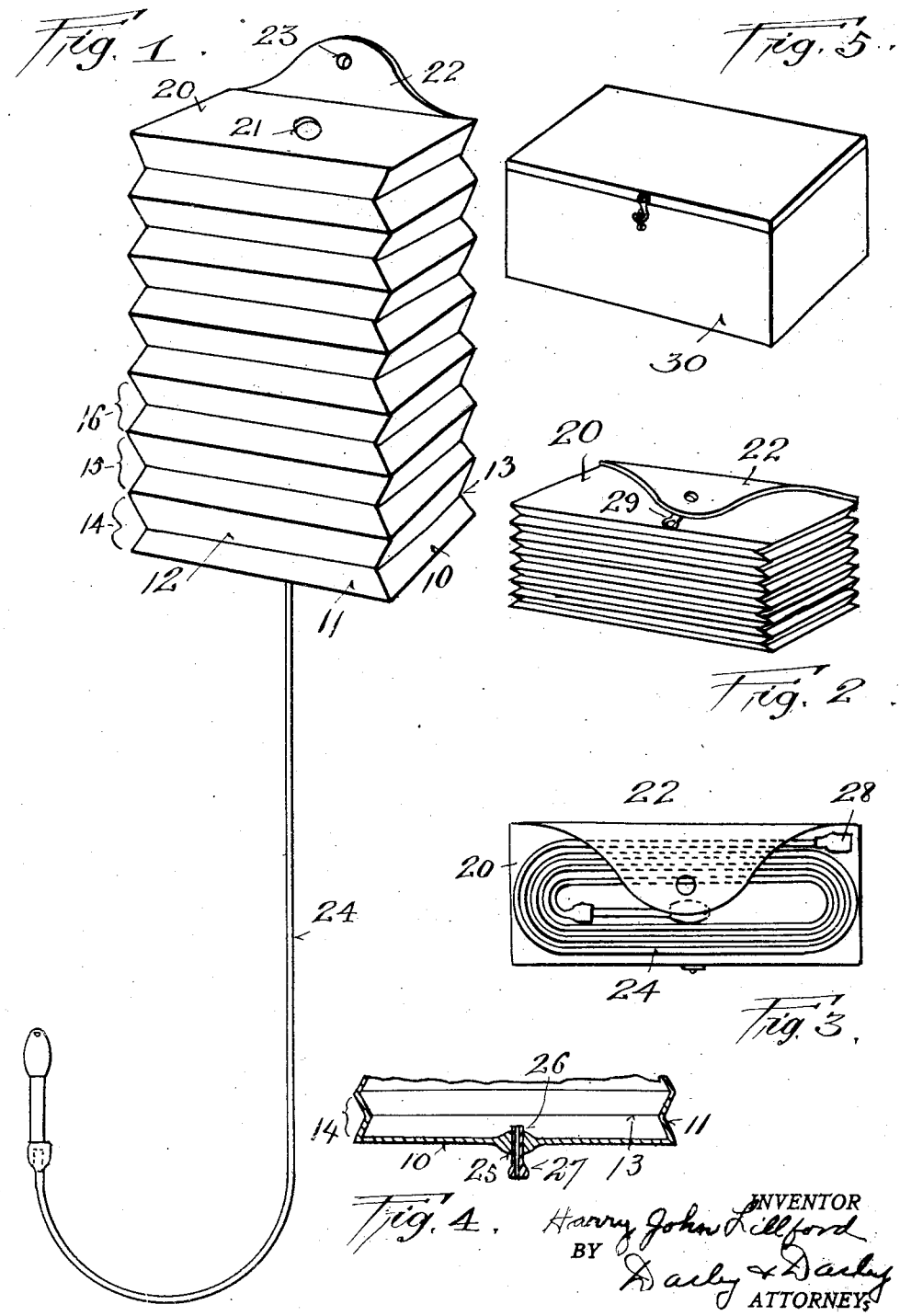

Patented June 25, 1929.

1,718,369

UNITED STATES PATENT OFFICE.

HARRY JOHN LILLFORD, OF NEW YORK, N. Y.

COLLAPSIBLE IRRIGATION BAG.

Application filed May 8, 1926. Serial No. 107,554.

This invention relates to irrigation bags, and has for its object the provision of a folding or collapsible structure which can be readily folded and placed in a compact space for moving, storing, or when traveling.

Another object includes the provision of a supporting flap or wing piece, which may be folded over the top end of the receptacle, and by which the receptacle is supported when in use. This wing serves also as a means for holding the irrigation tube neatly in packed position when the apparatus is folded.

In a specific form of construction, I provide a foldable device which is collapsible longitudinally, somewhat after the manner of an accordion, and the device is made of rubber or other suitable waterproof material in any desired shape or form.

Other objects will appear hereinafter, and I attain these objects by the construction shown in the accompanying drawing, in which Fig. 1 is a view in perspective showing my device in expanded position.

Fig. 2 is a view in perspective, showing my device folded.

Fig. 3 is a top plan view of the receptacle folded, and showing the manner of securing the irrigation tubing, and Fig. 4 shows a convenient container in which the apparatus may be packed.

Like numerals refer to similar parts throughout the several views.

In a preferred form of construction, I provide a waterproof structure of rubber or other suitable material. I form a fairly rigid base piece 10, of any desired shape. In the form selected, the shape of the base piece is rectangular, but obviously other shapes might be selected without departing from the spirit and scope of my invention.

In the structure shown, the base continues as a collapsible base fold 11, which extends completely around the base piece and merges with a similar shaped piece 12 at the constricted joint 13. The pieces 11 and 12 form the respective collapsible section 14, and onto this section a similar collapsible section 15 is formed, which again unites with a similar section 16. In this manner, as many sections are provided as may be required to provide the necessary or desired capacity of the bag.

The top piece 20 is of similar shape and construction to the base piece, except that a larger opening 21 is provided for receiving the irrigation fluid. This opening may be stoppered if desired, but ordinarily this is not necessary. I also provide a wing or flap 22, which is provided with a hole 23 for hanging up the apparatus.

The irrigation tube 24 may be applied to the base 10 in any desired manner as by a friction joint 25, which is formed about the outlet, and which engages the rigid tubule 26. This tubule is provided with a head 27, to receive and hold the socket 28 on the irrigation tube 24. Obviously other connections may be provided, and the end tubule may even be formed integral with the irrigation tube, without the use of the extra socket 28.

To pack my improved device, it is only necessary to collapse the bag and disconnect tube 24 from its engagement. The tube is then folded, as shown in Fig. 3, for example, and flap 22 is permitted to fold over the tube to hold the same in place by reason of tendency to fold downwards. If desired, however, a suitable fastener, as an elastic 29, may be supplied to the flap, as is shown, for example, in Fig. 2. The folded and assembled structure may be conveniently stored and carried in a receptacle 30, of any desired construction.

Having now disclosed my invention which I claim as new and useful, of my own invention, and desire to secure by United States Letters Patent, is:

A receptacle of the kind described, comprising a water bag having semi-rigid ends and side walls of substantially similar sections, collapsible longitudinally, a wing flap extending from said bag, the bottom of said bag having an opening and a tubule in said opening, said wing flap serving as a means for suspending said bag for use.

In testimony whereof I have hereunto set my hand on this 5th day of May, A. D. 1926.

HARRY JOHN LILLFORD.